(12) United States Patent
Uselton et al.

(10) Patent No.: US 11,675,086 B1
(45) Date of Patent: Jun. 13, 2023

(54) TIME-OF-FLIGHT-BASED APPARATUS, SYSTEMS, AND METHODS FOR MEASURING TUBULAR GOODS

(71) Applicant: SCAN SYSTEMS, CORP, The Woodlands, TX (US)

(72) Inventors: Danny Uselton, Spring, TX (US); Matt Rutledge, The Woodlands, TX (US)

(73) Assignee: SCAN SYSTEMS, CORP., The Woodlands, TX (US)

( * ) Notice: Subject to any disclaimer, the term of this patent is extended or adjusted under 35 U.S.C. 154(b) by 373 days.

(21) Appl. No.: 16/987,179

(22) Filed: Aug. 6, 2020

Related U.S. Application Data

(60) Provisional application No. 62/889,347, filed on Aug. 20, 2019.

(51) Int. Cl.
*G01S 17/894* (2020.01)
*G01B 11/04* (2006.01)
*G01S 7/481* (2006.01)

(52) U.S. Cl.
CPC ............ *G01S 17/894* (2020.01); *G01B 11/043* (2013.01); *G01S 7/4813* (2013.01)

(58) Field of Classification Search
CPC ..... G01S 17/894; G01B 11/043; G01S 7/4813
See application file for complete search history.

(56) References Cited

U.S. PATENT DOCUMENTS

| | | | |
|---|---|---|---|
| 3,579,099 A * | 5/1971 | Kanbayashi | |
| 3,684,348 A | 8/1972 | Rowland | |
| 3,712,706 A | 1/1973 | Stamm | |
| 4,025,159 A | 5/1977 | McGrath | |
| 4,202,600 A | 5/1980 | Burke et al. | |
| 4,243,618 A | 1/1981 | Van Arnam | |
| 4,495,465 A * | 1/1985 | Tomaiuolo et al. | |
| 4,588,258 A | 5/1986 | Hoopman | |
| 4,739,273 A * | 4/1988 | Petersen et al. | |
| 4,775,219 A | 10/1988 | Appeldorn et al. | |
| 4,938,563 A | 7/1990 | Nelson et al. | |
| 5,117,304 A | 5/1992 | Huang et al. | |
| 6,350,035 B1 | 2/2002 | Smith et al. | |

(Continued)

FOREIGN PATENT DOCUMENTS

CN 201886153 U 6/2011
JP 2000171211 A 6/2000

OTHER PUBLICATIONS

AN9003 - A User's Guide to Intrinsic Safety", retrieved from the Internet Jul. 12, 2017.

(Continued)

*Primary Examiner* — Sang H Nguyen
(74) *Attorney, Agent, or Firm* — Jeffrey L. Wendt; The Wendt Firm, P.C.

(57) ABSTRACT

A hand-held OCTG length measuring apparatus has hollow upper and lower bodies, a hand grip extending generally downward from the hollow upper body near the first end and including a source trigger, and a sensor housing extending generally downward from the hollow upper body. The sensor housing encloses a TOF source operatively connected to the source trigger. The hollow lower body shaped to include a frontal cavity positioned generally under the source housing, the frontal cavity having attached thereto a pipe end alignment bracket. The upper hollow body and the lower hollow body connected at a lower end of the hand grip and at a lower end of the sensor housing. The apparatus employs a minimum 40,000 lux laser (at 18 to 25 feet) and a polarized, diamond-grade reflector, to afford reliable, repeatable OCTG length measurements.

15 Claims, 5 Drawing Sheets

(56) References Cited

U.S. PATENT DOCUMENTS

| | | | |
|---|---|---|---|
| 7,042,555 | B1* | 5/2006 | Lawson |
| 8,665,452 | B2 | 3/2014 | Yan et al. |
| 8,952,947 | B2 | 2/2015 | Li et al. |
| 9,074,871 | B1 | 7/2015 | Lubeck et al. |
| 9,217,415 | B2 | 12/2015 | Bowyer et al. |
| 9,766,058 | B2 | 9/2017 | Kenzume et al. |
| 10,024,647 | B2 | 7/2018 | Chen et al. |
| 10,030,966 | B2 | 7/2018 | Kuroki et al. |
| 2007/0222438 | A1* | 9/2007 | Reeves |
| 2008/0129287 | A1* | 6/2008 | Matsumura |
| 2012/0160517 | A1* | 6/2012 | Bouligny et al. |
| 2012/0166125 | A1* | 6/2012 | Gysling |
| 2017/0328144 | A1* | 11/2017 | Roberson et al. |
| 2018/0001422 | A1* | 1/2018 | Rajagopalan et al. |

OTHER PUBLICATIONS

Polytec, "Industrial Length and Speed Control", Youtube video, downloaded from the Internet Mar. 28, 2019, url: http://youtu.be/bUcEMdnFpDA.

Nawfel, "Using laser velocimeters to improve tube and pipe production", thefabricator.com, pp. 1-5, published by Polytec, Irvine, California, presented by Peter Nawfel at Pipe & Tube Houston 2014, sponsored by the Tube & Pipe Association International® and the International Tube Association, Houston, Sep. 16-18, 2014.

* cited by examiner

TIME-OF-FLIGHT-BASED APPARATUS, SYSTEMS, AND METHODS FOR MEASURING TUBULAR GOODS

CROSS-REFERENCE TO RELATED APPLICATIONS

This application is entitled to and claims the benefit of earlier filed Provisional Application No. 62889347, filed Aug. 20, 2019, under 35 U.S.C. §119(e), which earlier filed provisional application is incorporated by reference herein in its entirety.

BACKGROUND INFORMATION

Technical Field

The present disclosure relates to apparatus and methods in the onshore and marine (offshore) hydrocarbon exploration, production, drilling, well completion, well intervention, and leak containment fields. More particularly, the present disclosure relates to time-of-flight-based apparatus, systems, and methods useful for measuring length of drill string tubulars and other oil country tubulars (sometimes referred to in the oil & gas industry as "oil country tubular goods", and herein sometimes as simply "OCTG").

Background Art

OCTG producers demand accuracy when measuring length of tubulars they are producing. A convenient method and apparatus is currently offered by the assignee of the present application, known under the trade designation TALLY-RITE, which relies on a use of a spool of cable of known length. This is typically a 2-person operation, with one person holding the spool, a second person holding the end of the measuring cable when it is being played out and held on the far end of the tubular. Length data may be recorded on a hand-held or belt-held electronics unit. This system may tally as many as 225 truckloads of material in a day. The apparatus and method have been highly successful, and pipe threaders, processors, truckers, inspection companies, pipe brokers or just anyone that needs to accurately measure pipe can use the TALLY-RITE apparatus and method.

In the last few years, laser-based OCTG length measuring systems have been developed. See for example U.S Pat. No. 9,074,871. The '871 patent describes a pipe measuring system and method requiring threaded pipe, and employs a hand-held portable laser instrument and a portable hand-held target that reflects the beam back to the instrument, where electronics records or calculates an effective length. The '871 patent does not describe the lux or lumen rating of the laser, and the target is described as any surface (e.g. a relatively flat, stiff card) that can be aligned with a distal axial end of the pipe being measured.

The current means of determining the OCTG length thus may be subject to inaccuracies. If the laser or other TOF-generating device is not of sufficient quality, ambient and direct light can make reliable measurements nearly impossible outdoors with a mid- or low-end lasers. A need exists for an OCTG length measuring apparatus that assures good, accurate tallies—even under bright sun sunlight. A further need exists for a laser-based OCTG length measuring apparatus that is both vibration and shock resistant, and offers long life, such as 50,000 or 100,000 hour average life, assuring years of reliable use. A further need exists for an ergonomically designed package (hand-held unit) for the TOF-generating device; if the device is not ergonomically designed, it will tend not to be used.

Nearly as important as the laser is the reflector or target used to send the light waves back to the electronics. A need exists for apparatus, systems, and methods of measuring length of OCTG that provides customers with greater accuracy, longer range, and no false readings. The laser must only read off of the target—not work trucks, forklifts or other obstacles that can negate the usefulness of other laser systems. This is a critical component to reliable, repeatable pipe tallies.

As may be seen, current practice of determining and tallying OCTG length may not be adequate for all circumstances, and at worst may result in injury to rig workers. There remains a need for more apparatus, systems, and methods allowing OCTG length to be determined and tallied, particularly for apparatus, systems, and methods that provides customers with greater accuracy, longer range, and no false readings. The methods and apparatus of the present disclosure are directed to these needs.

SUMMARY

In accordance with the present disclosure, apparatus and systems for determining OCTG length are presented, and methods of using same to determine length of OCTG are described which reduce or overcome many of the faults of previously known apparatus, systems, and methods.

A first aspect of the disclosure is a hand-held OCTG length measuring apparatus comprising:
 a) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a TOF source operatively connected to the source trigger, the sensor housing including a sensor window;
 (b) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the source housing, the frontal cavity having attached thereto a pipe end alignment bracket; and
 c) the upper hollow body and the lower hollow body connected at a lower end of the handle grip and at a lower end of the sensor housing.

In certain embodiments the apparatus may comprise a power unit positioned inside the hollow lower body and configured to power the TOF source and associated electronics for the sensor and source trigger. In certain embodiments the sensor window may comprise a laser selected from a group consisting of lasers having an illuminance at 18 to 25 feet distance from the laser of at least 40,000 lux. In certain embodiments the TOF sensor may be removably inserted into a metal sensor holder inside the sensor housing and removably fastened therein so as to be vibration resistant and shock resistant, using fastening method selected from the group consisting of welding, brazing, friction fitting, rubber seal fittings, threaded fitting, QC/QDC fittings, and cam and groove fittings. In certain embodiments the TOF sensor may be vertically aligned with a proximal end of the pipe end alignment bracket.

In certain embodiments the TOF source may be operated remotely via wired or wireless communication. In certain other embodiments the TOF source may be operated locally via on-board batteries, an on-board motor, and a programmable logic controller. Certain embodiments may comprise a software module including one or more algorithms for calculating parameters selected from the group consisting of total length of multiple pipe joints, effective length of pipe joints (in other words, total length minus overlapping coupled ends), and combinations thereof.

A second aspect of the disclosure is a system for measuring length of pipe or other OCTG, the system comprising:
(a) an apparatus comprising:
(i) a hollow upper body having a first longitudinal axis, a first end, a second end, a sidewall connecting the first and second ends, the sidewall parallel to the first longitudinal axis, a handle grip extending generally downward from the hollow upper body near the first end and including a source trigger, and a sensor housing extending generally downward from the hollow upper body near the second end, the sensor housing enclosing a 40,000 lux laser source (measured at 18 to 25 feet) operatively connected to the source trigger, the sensor housing including a sensor window, wherein the laser source is removably inserted into a metal sensor holder inside the sensor housing and removably fastened therein so as to be vibration resistant and shock resistant;
(ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the source housing, the frontal cavity having attached thereto a pipe end alignment bracket; and
(iii) the upper hollow body and the lower hollow body connected at a lower end of the handle grip and at a lower end of the sensor housing;
(iv) a power unit positioned inside the hollow lower body and configured to power the laser source and associated electronics for the sensor and source trigger; and
(b) a polarized, diamond-grade reflector plate configured to be placed adjacent and perpendicular to a distal end of a pipe or other OCTG.

Methods for accurately and repeatably determining OCTG length and optionally other OCTG parameters are further aspects of the disclosure and described herein.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain apparatus and methods may comprise a number of physical components and features, but may be devoid of certain optional hardware and/or other features.

BRIEF DESCRIPTION OF THE DRAWINGS

The manner in which the objectives of this disclosure and other desirable characteristics can be obtained is explained in the following description and attached drawings in which:

It is to be noted, however, that the appended drawings of FIGS. 1-5 may not be to scale and illustrate only typical system and apparatus embodiments of this disclosure. Furthermore, FIG. 6 illustrates only one of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
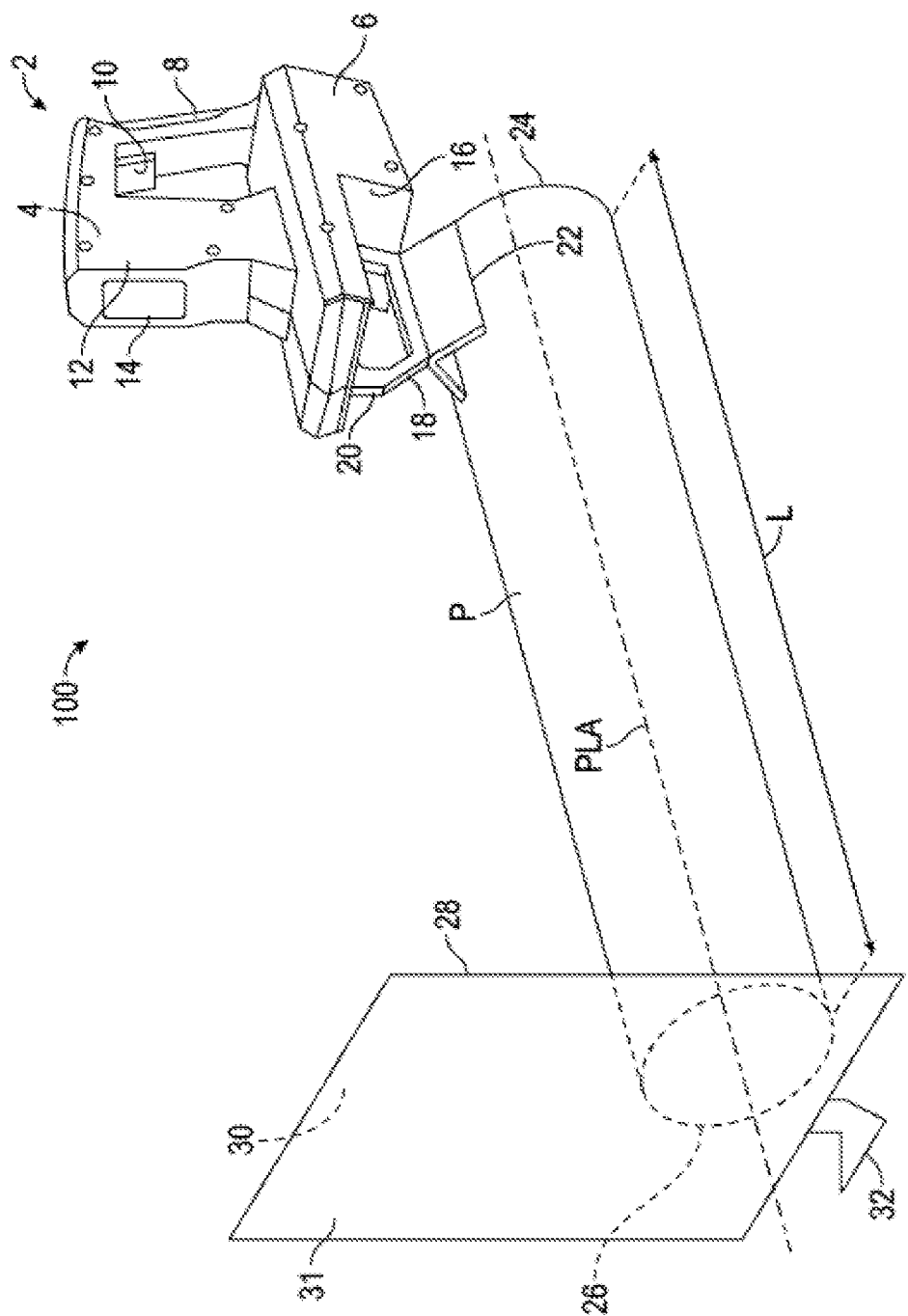
FIG. 1 is a schematic perspective view of one system embodiment of the present disclosure.

In the following description, numerous details are set forth to provide an understanding of the disclosed apparatus, combinations, and methods. However, it will be understood by those skilled in the art that the apparatus, systems, and methods disclosed herein may be practiced without these details and that numerous variations or modifications from the described embodiments may be possible. All U.S. published patent applications and U.S. patents referenced herein are hereby explicitly incorporated herein by reference, irrespective of the page, paragraph, or section in which they are referenced. Where a range of values describes a parameter, all subranges, point values and endpoints within that range are explicitly disclosed herein.

The present disclosure describes apparatus, systems, and methods for determining the length of OCTG or other tubular or pipe. By measuring distances and in certain embodiments, other parameters, the OCTG length may be determined at either a single point or multiple points.

As mentioned herein, OCTG means any tubular used in the oil & gas industry, whether hollow or solid, including but not limited to, drill pipe, line pipe, casing, rod pump rod sections, coiled tubing, and the like, including those that have been through none, all or a combination of any one or more of the common mechanical, thermal, chemical OCTG treatment methods.

The apparatus may comprise a single or multiple sensors (sometimes referred to herein as "instruments") using the "time of flight" principle to determine OCTG length. The sensor(s) may be mounted into the apparatus through a variety of ways depending on the sensor being installed, openings available in the apparatus, and the accuracy of length required. Software either intrinsic to the sensor, or installed elsewhere in the apparatus, or installed remotely on a computer type device, converts the time of flight measurements into usable calculated information. The usable calculated information may be displayed locally at the device and/or remotely on a computer type device.

Apparatus, systems, and methods employing single-point measurement send and receive a single "beam" to determine the distance to a single point, typically the distal end of the OCTG. Converting the time of flight of the beam, the length of OCTG at that single point would be determined. Apparatus, systems, and methods employing multipoint measurement send and receive an array of beams to determine the distance to multiple points on a plane defined by the reflector or target. Converting the time of flight and angle of the beams, the length of OCTG at different points along the plane would be determined.

The primary features of the apparatus, systems, and methods of the present disclosure will now be described with reference to the drawing figures, after which some of the construction and operational details, some of which are optional, will be further explained. The same reference numerals are used throughout to denote the same items in the figures.

Figure 2:
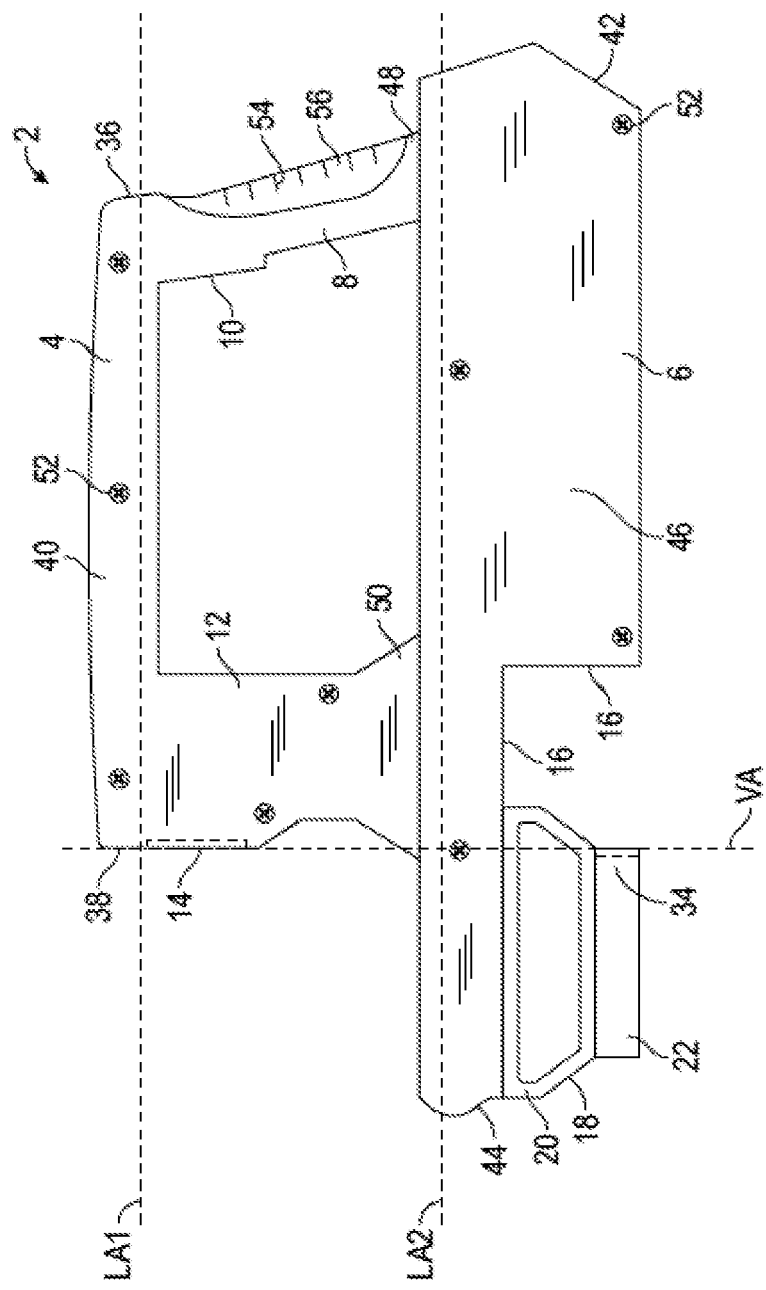
FIG. 2 is a schematic side elevation view of the hand-held apparatus illustrated schematically in FIG. 1.

Referring to FIGS. 1 and 2, certain embodiments, such as embodiment 100 illustrated schematically in FIG. 1, may comprise a hand-held apparatus 2 comprising an upper hollow body 4 having a first end 36, a second end 38, and a sidewall 40 connecting first and second ends 36, 38, and a first longitudinal axis "LA1". Hand-held apparatus 2 further comprises a hollow lower body 6, having a third end 42, a fourth end 44, and a second sidewall 46 connecting third and fourth ends 42, 44, and a second longitudinal axis "LA2". Longitudinal axis LA1 and LA2 are generally parallel to a pipe longitudinal axis "PLA". Hand-held apparatus 2 further includes a hand grip 8 extending generally downward from upper hollow body 4, including a trigger 10. A lower end 48 of hand grip 8 connects to lower hollow body 6 in this embodiment, but this is not required in all embodiments. Hand-held apparatus 2 further includes a sensor housing 12, including a sensor window 14. A lower end 50 of sensor housing 12 connects to lower hollow body 6 in this embodiment, but this is not required in all embodiments. One or both of hand grip 8 and sensor housing 12 connects upper hollow body 4 with lower hollow body 6. Hand grip 8 may be hollow or solid, depending on the arrangement of internal wiring, as further illustrated herein, and further depending on weight balance in different embodiments.

Referring again to FIGS. 1 and 2, lower hollow body 6 of hand-held apparatus 2 may comprise a shape defining a frontal cavity 16 that provides a space or region for attachment of a pipe end alignment bracket 18 comprising a main support bracket 20 and an inverted-V plate 22, the latter designed to rest on an outside surface of a pipe ("P") having a length "L", a proximal end 24, and a distal end 26, or other OCTG being measured. Inverted-V plate 22 includes an alignment plate 34 that allows a user to align sensor window 14 with proximal end 24 of pipe P along a vertical axis "VA" as illustrated in FIG. 2. In certain embodiments, hand-held apparatus 2 further may comprise two molded plastic halves held together by one or more screws or bolts 52; in embodiment 100, nine such screws or bolts 52 are illustrated. Embodiment 100 further includes optional gripper features 54 formed into an optional rubber hand grip portion 56.

Completing embodiment 100 is a reflector plate or "target" 28 having a retroreflective surface 30, which in certain embodiments may be a cube-corner retroreflective sheet material adhered to a cardboard, plastic, or metal back plate 31. An embodiment of a cube-corner retroreflective sheet is further described in reference to FIGS. 4 and 5. Reflector plate or target 28 may comprise a handle or stand 32, but this is not necessary in all embodiments.

Figure 3:
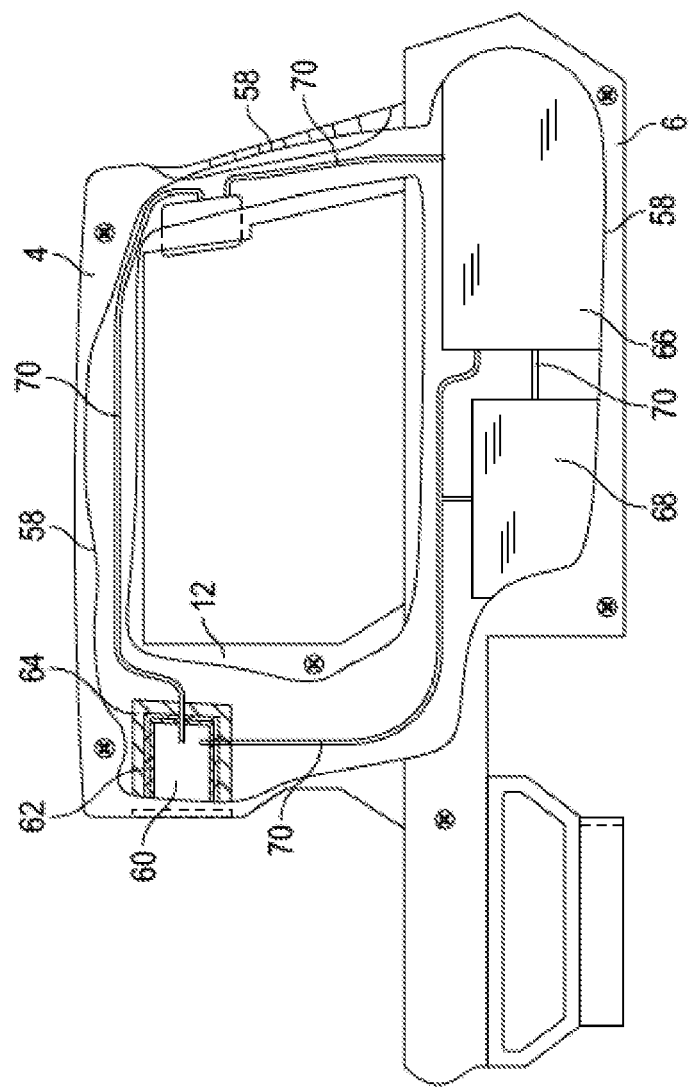
FIG. 3 is a schematic side elevation view of the hand-held apparatus illustrated schematically in FIG. 2, with parts cut-away.

FIG. 3 is a schematic side elevation view of the hand-held apparatus illustrated schematically in FIG. 2, with parts cutaway as indicated by irregular curved line 58. TOF sensor 60 is held in a metal sensor holder 62 having padding material 64 substantially surrounding sensor holder 62. Padding material 64, which may be one or more pads of the same or different material, increases the vibration and shock resistance of TOF sensor 60 and apparatus 2. Many diode lasers available commercially are packaged to provide "off the shelf" shock and vibrations resistance. Diode lasers such as those available from IDEX Health and Science, Carlsbad, California, U.S.A., under the trade designation DBA SERIES, are one suitable shock and vibration resistant diode laser. These lasers offer extremely compact and reliable sources of laser light with minimal thermal footprint and maximum resistance to mechanical shock and vibration, state-of-the art thermal management and mechanical design, resulting in ultra-compact laser heads that deliver minimal heat generation and maximum resistance to harsh environments and mechanical shock and vibration. Systems can be configured for direct analog and/or digital modulation, eliminating the cost, complexity and alignment challenges associated with external modulators. The diode lasers known under the trade designation DBA SERIES are compact and efficient in design, up to 200 mW output, wavelengths ranging from 405-642 nm, analog and digital modulation, power stability better than ±2%, and <0.5% RMS optical noise.

An on-board power unit 66 is included, which may be a permanent or rechargeable battery pack or transformer for electrical power, or both. An on-board electronics package 68 may include one or more microprocessors, a communications link (wired or wireless), and/or an on-board controller. Internal wiring is designated at 70 between the various components (trigger to TOF sensor, etc.).

Figure 4:
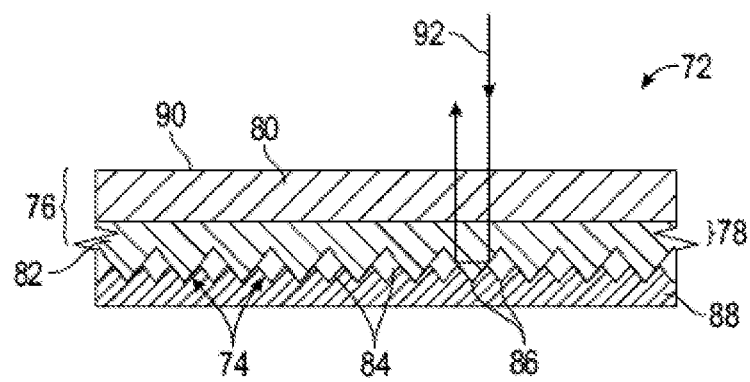
FIG. 4 is a schematic cross-sectional view.
Figure 5:
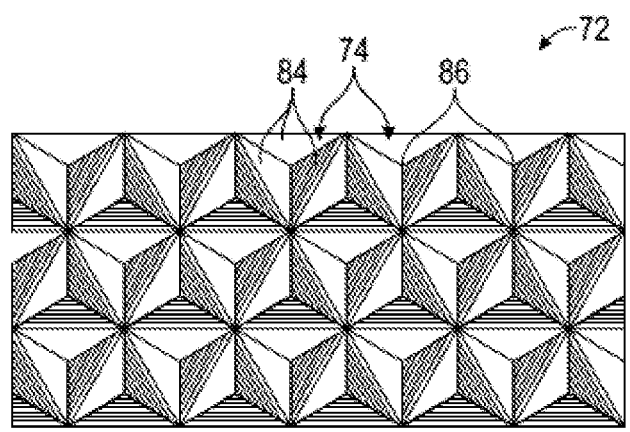
FIG. 5 is a plan view, of the reflective sheeting used in the reflector or target illustrated in FIG. 1.

FIG. 4 is a schematic cross-sectional view, and FIG. 5 is a plan view, of the retroreflective sheeting 72 used in the reflector or target 28 illustrated in FIG. 1 for system embodiment 100. The particulars of this retroreflective sheeting 72 are summarized here, and described more fully in U.S. Pat. No. 6,350,035. Cube-corner retroreflective sheeting 72 comprises a multitude of cube-corner elements 74 and a body portion 76. The body portion 76 can include a land layer 78 and a body layer 80. Body layer 80 typically functions to protect the sheeting from environmental elements and/or to provide significant mechanical integrity, to the sheeting. In a preferred embodiment, body layer 80 is the outermost layer on the front side of the sheeting 72. Land layer 78 is distinguished from body layer 80 by being a layer disposed immediately adjacent to the base of the cube-corner elements, and the term "land layer" is used herein to mean such a layer. Cube-corner elements 74 project from a first or rear side 82 of body portion 76. Cube-corner elements 74 comprise a light transmissible polymeric material having an elastic modulus greater than $16 \times 10^8$ pascals, preferably greater than $18 \times 10^8$ pascals, and more preferably greater than $20 \times 10^8$ pascals and body layer 80 comprises a light transmissible polymeric material having an elastic modulus less than $7 \times 10^8$ pascals, preferably greater than $5 \times 10^8$ pascals, and more preferably greater than $3 \times 10^8$ pascals. Thus, cube-corner elements 74 contain a polymeric material that has an elastic modulus that is at least $9 \times 10^8$ pascals greater than the polymeric material of body layer 80, and may be $11 \times 10^8$, $13 \times 10^8$, or even $17 \times 10^8$ pascals greater than body layer 80's polymeric material. Light enters cube-corner sheeting 72 through the front surface 90. The light then passes through body portion 76 and strikes planar faces 84 of cube-corner elements 74 and returns in the direction from which it came as shown by arrow 92. In a preferred construction, cube-corner elements 74 and land layer 78 are made from similar or the same kind of polymers, and land layer 78 is kept to a minimal thickness. Land layer 78, typically, has a thickness in the range of about 0 to 150 micrometers, and preferably in the range of approximately about 1 to 100 micrometers. Body layer 80 typically has a thickness of approximately 20 to 1,000 micrometers, and preferably in the range of about 50 to 250 micrometers. Although it is preferred to keep land layer 78 to a minimum thickness, it is desired that sheeting 72 possess some land layer 78 so that a flat interface can be provided between land layer 78 and body layer 80. Cube-corner elements 74 typically have a height in the range of about 20 to 500 micrometers, and more typically in the range of about 60 to 180 micrometers. Although the embodiment illustrated in FIG. 4 has a single body layer 80, it is within the scope of the present disclosure to provide more than one body layer 80 in body portion 76. FIG. 5 illustrates schematically the back side of the cube-corner elements 74. As illustrated schematically, cube-corner elements 74 are disposed as matched pairs in an array on one side of the sheeting. Each cube-corner element 74 has the shape of a trihedral prism with three exposed planar faces 84. Planar faces 84 may be substantially perpendicular to one another (as in the corner of a room) with the apex 86 of the prism vertically aligned with the center of the base. The angle between faces 84 typically is the same for each cube-corner element in the array and will be about 90°. The angle, however, can deviate from 90° as is well-known; see, for example, U.S. Pat. No. 4,775,219 to Appledorn et al. Although apex 86 of each cube-corner element 74 may be vertically aligned with the center of the base of the cube-corner element, see, for example, U.S. Pat. No. 3,684,348. The apex also may be canted to the center of the base as disclosed in U.S. Pat. No. 4,588,258. Thus, embodiments of the present disclosure are not limited to any particular cube-corner geometry; however, of the many known cube-corner configurations, see, for example, U.S. Pat. Nos. 4,938,563, 4,775,219, 4,243,618, 4,202,600, and 3,712,706, the cube-corner sheeting described in U.S. Pat. No. 4,588,258 may be preferred because it provides wide angle retroreflection among multiple viewing planes. A specular reflective coating such as a metallic coating (not shown) can be placed on the backside of the cube-corner elements 74 to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 4,025,159 and 5,117,304. The sealing film maintains an air interface at the backside of the cubes to enhance retroreflectivity. A backing or an adhesive layer 88 is also disposed behind the cube-corner elements to enable the cube-corner retroreflective sheeting 72 to be secured to a substrate. The polymeric materials that compose the retroreflective sheeting are light transmissible. This means that the polymer is able to transmit at least 70 percent of the intensity of the light incident upon it at a given wavelength. More preferably, the polymers that are used in the retroreflective sheeting have a light transmissibility of greater than 80 percent, and more preferably greater than 90 percent. The polymeric materials that are employed in the cube-corner elements tend to be hard and rigid. The polymeric materials may be thermoplastic or crosslinkable resins. The elastic modulus of these polymers preferably is greater than $18 \times 10^8$ pascals, and more preferably is greater than $20 \times 10^8$ pascals. When thermoplastic polymers are used in the cubes, the glass transition temperature generally is greater than 80° C., and the softening temperature is typically greater than 150° C. Generally, the thermoplastic polymers used in the cube-corner layer are amorphous or semicrystalline, and the linear mold shrinkage of the polymer generally is less than one percent. Further information on the polymers may be had by review of the '035 patent.

In certain embodiments, a TOF sensor or instrument 60 may be removably attached to sensor holder 62 for example by rubber seals on the outside of TOF sensor 60 or inside of sensor holder 62, welding, brazing, threaded couplings, QC/QDC couplings, API couplings, clamps, or other fasteners. It will be appreciated that TOF sensor 60 need not be "permanently" installed in sensor holder 62. In certain embodiments TOF instrument 60 may have a display included with it. TOF instrument 60 in embodiment 100 would most probably be a single point measurement device.

In certain embodiments, not illustrated, a sensor may be positioned outside or adjacent upper hollow body 4 or even adjacent to sensor housing 12. In certain embodiments, the sensor 60 or the entire apparatus 2 may be on a stand or frame outside of and adjacent to the OCTG being measured. In certain embodiments there might be a "stand" or frame separate from and not adjacent to the OCTG, where the sensor is mounted on a movable wand or hose-like device that could be stabbed into sensor housing 12 in apparatus 2.

In the present application, the phrase "single point measurement" means only that a single time of flight sensor is employed, not that length at only a single point is measured. In certain embodiments, rotation in the vertical plane will allow apparatus 2 to measure OCTG length at various points around the circumference of the OCTG, if desired.

The TOF sensor or instrument 60 may be threaded, latched, welded or otherwise removably inserted into sensor receiver 62. Rubber or other vibration and shock resistant pads 64 (FIG. 3) around the outside of sensor receiver 62 or on the exterior of TOF instrument 60 (or both) may be employed to reduce or eliminate shock and vibration of TOF instrument 60.

Apparatus 2 and TOF sensor 60 may, in certain embodiments, be powered from within via an instrument display or other human/machine interface (HMI) (not illustrated), for example using batteries, Li-ion or other type. In other embodiments display/HMI may be powered from an instrument cable providing power to TOF instrument 60, perhaps by a local generator, or grid power. The display/HMI on apparatus 2 allows an operator to interface with the instrument. In certain embodiments the operator will be able to take measurements, view or read these measurements and reset the instrument for subsequent measurement taking. If the display/HMI is connected to a power cable, then measurements may be taken remotely, stored and reset as necessary.

In certain embodiments the upper and lower hollow bodies 4, 6, as well as hand grip 8, sensor housing 12, and vibration and shock resistant materials of pads 64, may be comprised of a suitable material to withstand an oilfield environment. Such materials function to keep ambient air and any harmful constituents, such as hydrocarbons, out of the apparatus. Suitable materials include various metals and alloys, natural and man-made rubber compounds, elastomeric compounds, thermoplastic compounds, thermoset compounds, and the like, with or without fillers, additives, coupling agents, and other optional additives. Upper and lower hollow bodies 4, 6, as well as hand grip 8 and sensor housing 12 should have sufficient strength to withstand any mechanical stress (compression, tensile, shear) or other loads imposed on them by users. Upper and lower bodies 4, 6, hand grip 8, and sensor housing 12, and sensor window 14 should be capable of withstanding long term exposure to probable liquids and vapors, including hydrocarbons, drilling fluids (oil-based and water-based), solvents, brine, anti-freeze compositions, hydrate inhibition chemicals, and the like, typically encountered in offshore and onshore drilling activities. Sensor window 14 may be quartz, fused silica, and the like.

Systems and apparatus of the present disclosure will work by the operator initiating the TOF instrument 60 to take a reading by depressing trigger 10. The TOF instrument, using the principle of "time of flight" will record a time and knowing the speed of the beam, determine the distance from the TOF sensor within the instrument to the target point plate 28 positioned at the distal end of the OCTG as illustrated in FIG. 1. The apparatus will then convert this time into a distance. Further calculations performed within the apparatus may allow the operator to read the total length of a plurality of OCTG members, the total length frequently referred to in the art as a "tally." If the ambient conditions are humid, and/or there are frequent temperature changes while tallying, certain embodiments may include components and electronics allowing corrections for changes in the refractive index of ambient air, as taught by U.S. Pat. Nos. 8,665,452 and 10,024,647. The value of laser wavelength in air is closely related to the refractive index of the air through which the laser passes. The apparatus may include statistical algorithms that allow the operator insight as to how uniform in length the various OCTG joints are, such as mean or median average length, standard deviation, and the like.

In certain embodiments power would be supplied to apparatus 2 at a voltage and current that enables the device to be intrinsically safe. By "intrinsically safe" is meant the definition of intrinsic safety used in the relevant IEC apparatus standard IEC 60079-11, defined as a type of protection based on the restriction of electrical energy within apparatus and of interconnecting wiring exposed to the potentially explosive atmosphere to a length below that which can cause ignition by either sparking or heating effects. For more discussion, see "AN9003 - A User's Guide to Intrinsic Safety", retrieved from the Internet Jul. 12, 2017, and incorporated herein by reference.

Previous measurements taken of length of a plurality of OCTG allow the software to calculate the volume of those OCTG when assembled into a drill string, line pipe, or other pipeline, or alternatively the number of OCTG joints of a given length if a total tally is all that is available. This measurement on a time-based axis allows calculation of the rate at which OCTG are being produced, or rate they are being deployed downhole, or a rate at which they are being finished or treated.

Certain embodiments may employ a 3D time of flight sensor. Such sensors may be exemplified by those described by Texas Instruments. 3D time of flight products, tools and development kits enable machine vision with a real-time 3D imaging camera. From robotic navigation to gesture recognition and building automation, TI's 3D time of flight chipsets allow for maximum flexibility to customize a camera's design. 3D time of flight operates by illuminating an area with modulated IR light. By measuring the phase change of the reflected signal the distance can be accurately determined for every pixel in the sensor creating a 3D map of the subject or scene, for example a rack of pipe or other OCTG.

One suitable TOF sensor is the sensor known under the trade designation "OPT8241 time-of-flight (TOF) sensor" available from Texas Instruments (TI). The device combines TOF sensing with an optimally-designed analog-to-digital converter (ADC) and a programmable timing generator (TG). The device offers quarter video graphics array (QVGA 320 × 240) resolution data at frame rates up to 150 frames per second (600 readouts per second). The built-in TG controls the reset, modulation, readout, and digitization sequence. The programmability of the TG offers flexibility to optimize for various length-sensing performance metrics (such as power, motion robustness, signal-to-noise ratio, and ambient cancellation). Features of the TOF sensor known under the trade designation "OPT8241 time-of-flight (TOF) sensor" available from Texas Instruments (TI) are provided in Table 1.

TABLE 1

"OPT8241 time-of-flight (TOF) sensor" available from Texas Instruments (TI)

- Imaging Array:
  - 320 × 240 Array
  - ⅓" Optical Format
  - Pixel Pitch: 15 μm
  - Up to 150 Frames per Second
- Optical Properties:
  - Responsivity: 0.35 A/W at 850 nm
  - Demodulation Contrast: 45% at 50 MHz
  - Demodulation Frequency: 10 MHz to 100 MHz
- Output Data Format:
  - 12-Bit Phase Correlation Data
  - 4-Bit Common-Mode (Ambient)
- Chipset Interface:
  - Compatible with TI's Time-of-Flight Controller OPT9221
- Sensor Output Interface:
  - CMOS Data Interface (50-MHz DDR, 16-Lane Data, Clock and Frame Markers)
  - LVDS:
    - 600 Mbps, 3 Data Pairs
    - 1-LVDS Bit Clock Pair, 1-LVDS Sample Clock Pair
- Timing Generator (TG):
  - Addressing Engine with Programmable Region of Interest (ROI)
  - Modulation Control
  - De-Aliasing
  - Master, Slave Sync Operation
- I²C Slave Interface for Control
- Power Supply:
  - 3.3-V I/O, Analog
  - 1.8-V Analog, Digital, I/O
  - 1.5-V Demodulation (Typical)
- Optimized Optical Package (COG-78):
  - 8.757 mm × 7.859 mm × 0.7 mm
  - Integrated Optical Band-Pass Filter (830 nm to 867 nm)
  - Optical Fiducials for Easy Alignment
- Operating Temperature: 0° C. to 70° C.

What has not been recognized or realized are apparatus, systems, and methods to accurately and repeatably determine OCTG length, especially in outdoor sunlight areas, where the sun's irradiance may be 40,000 lux or more. Apparatus, systems, and methods to accomplish this without significant risk to workers is highly desirable.

Figure 6:
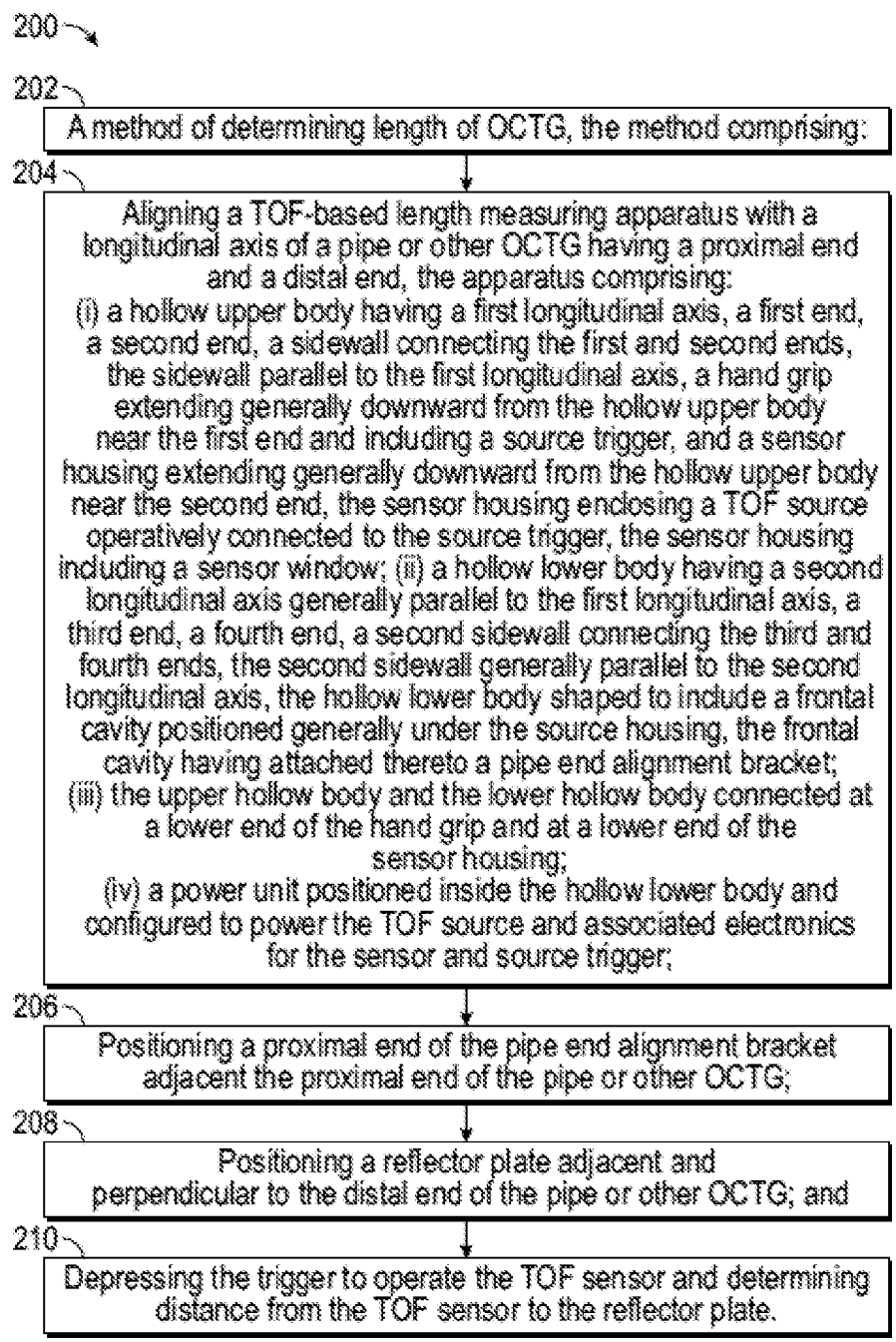
FIG. 6 is a logic diagram of one method of determining length of pipe or other OCTG.

FIG. 6 is a logic diagram of one method embodiment 200 for accurately and repeatably determining length of OCTG. Method embodiment 200, illustrated in the logic diagram of FIG. 6, comprises a method of determining length of OCTG, the method comprising (box 202): aligning a TOF-based length measuring apparatus with a longitudinal axis of a pipe or other OCTG having a proximal end and a distal end, the apparatus comprising: (i) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a TOF source operatively connected to the source trigger, the sensor housing including a sensor window; (ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the source housing, the frontal cavity having attached thereto a pipe end alignment bracket; (iii) the upper hollow body and the lower hollow body connected at a lower end of the hand grip and at a lower end of the sensor housing; (iv) a power unit positioned inside the hollow lower body and configured to power the TOF source and associated electronics for the sensor and source trigger (box 204). Method embodiment 200 further comprises positioning a proximal end of the pipe end alignment bracket adjacent the proximal end of the pipe or other OCTG (box 206); positioning a reflector plate adjacent and perpendicular to the distal end of the pipe or other OCTG (box 208); and depressing the trigger to operate the TOF sensor and determining distance from the TOF sensor to the reflector plate (box 210).

In other embodiments, the hollow bodies 4, 6, hand grip 8, and sensor housing 12 need not have the shapes illustrated in the various drawing figures, but rather could take any shape, such as a box or cube shape, elliptical, triangular, pyramidal (for example, three or four sided), prism-shaped, hemispherical or semi-hemispherical-shaped (dome-shaped), or combination thereof and the like, as long as the TOF sensor is able to be pointed at the target. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, and the like), oil tool designs, logos, letters, words, nicknames (for example BIG JAKE, and the like). Hand holds may be machined or formed to have easy-to-grasp features for fingers, or may have rubber grips shaped and adorned with ornamental features, such as raised knobby gripper patterns.

Thus the apparatus, systems, and methods described herein provide a quick and safe way of determining OCTG length accurately and repeatably.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to mount the apparatus 2 and/or the target 28 on the same or separate frames, trailers, skids, or portable carts.

What is claimed is:

1. A hand-held OCTG length measuring apparatus comprising:
    a) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a TOF source operatively connected to the source trigger, the sensor housing including a sensor window;
    (b) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the sensor housing, the frontal cavity having attached thereto a pipe end alignment bracket; and
    c) the upper hollow body and the lower hollow body connected at a lower end of the hand grip and at a lower end of the sensor housing.

2. The apparatus of claim 1 comprising a power unit positioned inside the hollow lower body and configured to power the TOF source and associated electronics for the sensor and source trigger.

3. The apparatus of claim 1 wherein the sensor window comprises quartz or fused silica.

4. The apparatus of claim 1 wherein the TOF source comprises a laser selected from a group consisting of lasers having an illuminance at 18 to 25 feet distance from the laser of at least 40,000 lux.

5. The apparatus of claim 1 wherein the TOF sensor is removably inserted into a metal sensor holder inside the sensor housing and removably fastened therein so as to be vibration resistant and shock resistant.

6. The apparatus of claim 1 wherein the TOF sensor is vertically aligned with a proximal end of the pipe end alignment bracket.

7. A system for accurately and repeatably determining OCTG length, the system comprising:
    (a) a hand-held OCTG length measuring apparatus comprising:
        (i) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a TOF source operatively connected to the source trigger, the sensor housing including a sensor window, the TOF source comprising a laser selected from a group consisting of lasers having an illuminance at 18 to 25 feet distance from the laser of at least 40,000 lux;
        (ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the sensor housing, the frontal cavity having attached thereto a pipe end alignment bracket, the pipe end alignment bracket configured to be positioned adjacent to a proximal end of a pipe or other OCTG; and (iii) the upper hollow body and the lower hollow body connected at a lower end of the hand grip and at a lower end of the sensor housing; and (b) a reflector plate configured to be placed adjacent and perpendicular to a distal end of the pipe or other OCTG.

8. The system of claim 7 wherein the reflector plate comprises a polarized, diamond-grade surface configured to be placed adjacent and perpendicular to the distal end of the pipe or other OCTG.

9. A system for accurately and repeatably determining OCTG length, the system comprising:
(a) a hand-held OCTG length measuring apparatus comprising:
  (i) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a a TOF source operatively connected to the source trigger, the sensor housing including a sensor window;
  (ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the sensor housing, the frontal cavity having attached thereto a pipe end alignment bracket, the pipe end alignment bracket configured to be positioned adjacent to a proximal end of a pipe or other OCTG; and
  (iii) the upper hollow body and the lower hollow body connected at a lower end of the hand grip and at a lower end of the sensor housing; and
(b) a polarized, diamond-grade reflector plate configured to be placed adjacent and perpendicular to the distal end of the pipe or other OCTG.

10. A system for accurately and repeatably determining OCTG length, the system comprising:
(a) a hand-held OCTG length measuring apparatus comprising:
  (i) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a a TOF source operatively connected to the source trigger, the sensor housing including a sensor window, the TOF sensor is removably inserted into a metal sensor holder inside the sensor housing and removably fastened therein so as to be vibration resistant and shock resistant;
  (ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the sensor housing, the frontal cavity having attached thereto a pipe end alignment bracket, the pipe end alignment bracket configured to be positioned adjacent to a proximal end of a pipe or other OCTG; and
  (iii) the upper hollow body and the lower hollow body connected at a lower end of the hand grip and at a lower end of the sensor housing; and
(b) a polarized, diamond-grade reflector plate configured to be placed adjacent and perpendicular to the distal end of the pipe or other OCTG.

11. A method of determining length of OCTG, the method comprising:
(a) aligning a TOF-based length measuring apparatus with a longitudinal axis of a pipe or other OCTG having a proximal end and a distal end, the apparatus comprising:
  (i) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a TOF source operatively connected to the source trigger, the sensor housing including a sensor window;
  (ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the sensor housing, the frontal cavity having attached thereto a pipe end alignment bracket;
  (iii) the upper hollow body and the lower hollow body connected at a lower end of the hand grip and at a lower end of the sensor housing;
  (iv) a power unit positioned inside the hollow lower body and configured to power the TOF source and associated electronics for the sensor and source trigger;
(b) positioning a proximal end of the pipe end alignment bracket adjacent the proximal end of the pipe or other OCTG;
(c) positioning a reflector plate adjacent and perpendicular to the distal end of the pipe or other OCTG; and
(d) depressing the trigger to operate the TOF sensor and determining distance from the TOF sensor to the reflector plate.

12. The method of claim 11 wherein the step of positioning the reflector plate adjacent and perpendicular to the distal end of the pipe or other OCTG comprises positioning a polarized, diamond-grade reflector plate adjacent and perpendicular to the distal end of the pipe or other OCTG.

13. The method of claim 11 wherein the step of depressing the trigger to operate the TOF sensor comprises operating a TOF source comprising a laser selected from a group consisting of lasers having an illuminance at 18 to 25 feet distance from the laser of at least 40,000 lux.

14. The method of claim 11 comprising vertically aligning the TOF sensor with a proximal end of the pipe end alignment bracket prior to depressing the trigger.

15. A system for measuring length of pipe or other OCTG, the system comprising:
(a) an apparatus comprising:

(i) a hollow upper body having a first longitudinal axis, a first end, a second end, a sidewall connecting the first and second ends, the sidewall parallel to the first longitudinal axis, a hand grip extending generally downward from the hollow upper body near the first end and including a source trigger, and a sensor housing extending generally downward from the hollow upper body near the second end, the sensor housing enclosing a 40,000 lux laser source measured at 18 to 25 feet operatively connected to the source trigger, the sensor housing including a sensor window, wherein the laser source is removably inserted into a metal sensor holder inside the sensor housing and removably fastened therein so as to be vibration resistant and shock resistant;

(ii) a hollow lower body having a second longitudinal axis generally parallel to the first longitudinal axis, a third end, a fourth end, a second sidewall connecting the third and fourth ends, the second sidewall generally parallel to the second longitudinal axis, the hollow lower body shaped to include a frontal cavity positioned generally under the sensor housing, the frontal cavity having attached thereto a pipe end alignment bracket; and (iii) the upper hollow body and the lower hollow body connected at a lower end of the hand grip and at a lower end of the sensor housing;

(iv) a power unit positioned inside the hollow lower body and configured to power the laser source and associated electronics for the sensor and source trigger; and (b) a polarized, diamond-grade reflector plate configured to be placed adjacent and perpendicular to a distal end of a pipe or other OCTG.

* * * * *